US012130229B2

(12) United States Patent
Van Nieuwstadt et al.

(10) Patent No.: US 12,130,229 B2
(45) Date of Patent: Oct. 29, 2024

(54) DEVICE AND A METHOD FOR LIGHT-BASED ANALYSIS OF A SUBSTANCE IN A LIQUID SAMPLE

(71) Applicant: Stichting IMEC Nederland, Wageningen (NL)

(72) Inventors: Joris Van Nieuwstadt, Maarn (NL); Jan Willem De Wit, Deventer (NL)

(73) Assignee: Stichting IMEC Nederland, Wageningen (NL)

( * ) Notice: Subject to any disclaimer, the term of this patent is extended or adjusted under 35 U.S.C. 154(b) by 364 days.

(21) Appl. No.: 17/696,036

(22) Filed: Mar. 16, 2022

(65) Prior Publication Data
US 2022/0299430 A1    Sep. 22, 2022

(30) Foreign Application Priority Data
Mar. 17, 2021 (EP) ..................................... 21163111

(51) Int. Cl.
*G01N 21/33*    (2006.01)
*B01L 3/00*    (2006.01)
*G01N 1/14*    (2006.01)

(52) U.S. Cl.
CPC ........ *G01N 21/33* (2013.01); *B01L 3/502715* (2013.01); *G01N 1/14* (2013.01);
(Continued)

(58) Field of Classification Search
CPC .... G01N 21/33; G01N 1/14; G01N 2201/062; G01N 2021/115; G01N 2021/152;
(Continued)

(56) References Cited

U.S. PATENT DOCUMENTS

| 3,526,462 A | 9/1970 | Mccurdy et al. |
| 5,185,531 A | 2/1993 | Wynn |

(Continued)

FOREIGN PATENT DOCUMENTS

| EP | 0039088 A1 | 11/1981 | |
| EP | 3176565 B1 * | 4/2021 | ............. G01N 21/01 |
| WO | WO-2014011409 A1 | 1/2014 | |

OTHER PUBLICATIONS

Espacenet English translation of EP 0039088 (Year: 1981).*
Extended European Search Report in EP21163111.4 dated Aug. 27, 2021.

*Primary Examiner* — Mohamed K Amara
(74) *Attorney, Agent, or Firm* — MOSER TABOADA

(57) ABSTRACT

A device for light-based analysis of a substance in a liquid sample comprises: an analysis cell for holding the liquid sample during analysis; a plunger configured for movement along walls of the analysis cell for allowing entry of the liquid sample into the analysis cell and pushing the liquid sample out of the analysis cell, wherein a first analysis measurement is allowed to be performed while a second portion of the plunger is arranged between a light source and a light detector; wherein the plunger is movable to a completely retracted position in the analysis cell for allowing a second analysis measurement to be performed such that light being detected by the light detector is passed through the liquid sample filling a space between opposite walls of the analysis cell.

13 Claims, 5 Drawing Sheets

(52) U.S. Cl.
CPC ............... *B01L 2300/0654* (2013.01); *B01L 2400/0487* (2013.01); *G01N 2201/062* (2013.01)

(58) Field of Classification Search
CPC ... G01N 2021/3148; G01N 2021/3181; G01N 2201/0627; G01N 21/15; G01N 21/274; G01N 21/3151; G01N 21/11; B01L 3/502715; B01L 2300/0654; B01L 2400/0487
See application file for complete search history.

(56) References Cited

U.S. PATENT DOCUMENTS

| | | | |
|---|---|---|---|
| 6,939,717 B2 * | 9/2005 | Jiang | E21B 49/10 436/25 |
| 8,144,319 B2 | 3/2012 | Preiner et al. | |
| 2005/0117156 A1 * | 6/2005 | Siepmann | G01N 21/31 356/436 |
| 2008/0174768 A1 | 7/2008 | Belz | |
| 2009/0128818 A1 * | 5/2009 | Goodwin | G01N 33/2823 356/326 |
| 2012/0085144 A1 | 4/2012 | Krolak et al. | |
| 2012/0205547 A1 * | 8/2012 | Klinkhammer | G01N 21/33 250/395 |
| 2013/0019664 A1 | 1/2013 | Preiner et al. | |
| 2015/0060303 A1 * | 3/2015 | Blohm | B01L 3/502 205/792 |
| 2019/0277756 A1 * | 9/2019 | Foord | G01N 21/8507 |
| 2022/0299435 A1 * | 9/2022 | Van Nieuwstadt | G01N 21/05 |

* cited by examiner

DEVICE AND A METHOD FOR LIGHT-BASED ANALYSIS OF A SUBSTANCE IN A LIQUID SAMPLE

CROSS-REFERENCE TO RELATED APPLICATIONS

This application claims priority to European Application No. 21163111.4, filed on Mar. 17, 2021 incorporated herein by reference in its entirety.

TECHNICAL FIELD

The present inventive concept relates to a device and a method for light-based analysis of a substance in a liquid sample. In particular, the present inventive concept relates to a device and a method for determining a concentration of a substance of interest in the liquid sample.

BACKGROUND

Measurement of concentration of nitrate in water is relevant in many domains, including agriculture, industry, and nature. Nitrate concentration may be an indicator of fertilization, which can have an impact on growth of both wild plants and agricultural crops.

Thus, it is of interest to measure concentration of nitrate in water. In particular, in many applications, it may be of interest to monitor nitrate concentration at frequent intervals. Thus, it is desired that measurements of concentration of nitrate are simple, such that measurements can be carried out quickly, and/or that measurements of concentration of nitrate can be performed in an automated manner.

Measurements may be performed using a light-based analysis, wherein a sample is illuminated using a wavelength corresponding to an absorbance peak of nitrate and an amount of light transmitted through the sample is measured. Light will be absorbed by the nitrate in the sample and the measurement of transmitted light can be related to an intensity of illumination light in order to determine concentration of nitrate in the sample. However, for samples of different concentrations, the amount of light transmitted through the liquid sample may vary substantially. If too low or too high intensities of light are passed through the liquid sample, accurate determination of the concentration is not possible. Therefore, it would be desired that different path lengths of the liquid sample be used for different concentrations of nitrate in the sample. However, adjusting path lengths of a sample may be cumbersome and require disassembling a device for performing measurements. This may prevent automated measurements to be performed for varying concentrations of nitrate in the sample.

It should be realized that although discussed here for purposes of measurement of nitrate concentration in a liquid sample, in other applications measurement of concentration of other substances may be desired using light of a wavelength corresponding to an absorbance peak of a substance of interest.

SUMMARY

An objective of the present inventive concept is to facilitate reliable light-based measurements of a substance in a liquid sample for varying concentrations of the substance between different liquid samples. It is a particular objective to enable automated light-based measurements.

These and other objectives of the present inventive concept are at least partly met by the invention as defined in the independent claims. Preferred embodiments are set out in the dependent claims.

According to a first aspect, there is provided a device for light-based analysis of a substance in a liquid sample, said device comprising: an analysis cell for holding the liquid sample during analysis; an inlet and outlet for transporting the liquid sample to and from the analysis cell; a light source for generating light for illuminating the liquid sample in the analysis cell; a light detector for detecting light, wherein the light detector and the light source are arranged on opposite sides of the analysis cell such that the light detector is configured to detect light having passed through the liquid sample; a plunger configured to fit in the analysis cell and configured for movement along walls of the analysis cell for allowing entry of the liquid sample into the analysis cell and pushing the liquid sample out of the analysis cell, wherein the plunger comprises a first portion having a first thickness corresponding to a cross-section of the analysis cell and a second portion having a second thickness which is smaller than the first thickness for allowing a first analysis measurement to be performed while the second portion of the plunger is arranged between the light source and the light detector such that light being detected by the light detector is passed through the second portion and through the liquid sample between the second portion of the plunger and a wall of the analysis cell; wherein the plunger is movable to a completely retracted position in the analysis cell for allowing a second analysis measurement to be performed such that light being detected by the light detector is passed through the liquid sample filling a space between opposite walls of the analysis cell.

For samples having a high concentration of a substance of interest, a short path length may be needed in order to ensure that not all light is absorbed before reaching the light detector. For samples having a low concentration of a substance of interest, a long path length may be needed, because absorption of the liquid sample may otherwise be too small to measure.

Since the device enables adjustment of the path length by simply moving the plunger between different positions, the device is adapted for performing accurate measurements of large variations of concentrations of a substance of interest. Further, this implies that the device provides a simple manner of adjusting a path length through a liquid sample.

The plunger is configured to be moved back and forth in the analysis cell for allowing entry of the liquid sample into the analysis cell and pushing the liquid sample out of the analysis cell. The device further uses the plunger for allowing analysis measurements to be performed through different thicknesses of liquid sample and hence for different path lengths.

The second portion of the plunger may be configured not to absorb the wavelength of light generated by the light source(s) so as to ensure that the second portion of the plunger does not affect the measurement by the light detector. Hence, an amount of light detected by the light detector may be contributed to the liquid sample having a short path length when the first analysis measurement is performed.

The first and second analysis measurements may be performed for the same sample so as to ensure that a concentration of a substance of interest may be accurately determined using at least one of the first and the second analysis measurements. The two analysis measurements may be quickly performed, such that speed of performing an analysis is not highly affected. Further, this implies that there is no need of determining whether an accurate determination is possible based on one analysis measurement, before deciding whether to perform another analysis measurement on the liquid sample.

However, it should be realized that in some embodiments, the device may perform only one of the first or the second analysis measurement for a particular liquid sample, e.g. based on an expected concentration of the substance of interest.

The light source may for instance be a light-emitting diode (LED) or a laser, which may be configured to generate light of a relatively narrow wavelength band. Thus, the light source may illuminate the liquid sample using a wavelength of light corresponding to a particular interaction of the substance in the liquid sample with light. For instance, the substance may have high absorbance at the wavelength or may be configured to scatter light. However, it should be realized that the light source may be a broadband light source, which may be combined with a filter for passing a particular wavelength towards the liquid sample. Also, it should be realized that in some embodiments, light interaction of the substance is not limited to a narrow wavelength band and the light source may illuminate the substance using a broad range of wavelengths, while still enabling analysis of the substance. For instance, the substance may exhibit high absorbance over the broad range of wavelengths such as to allow analysis of the substance in the liquid sample.

The light detector may be any type of detector sensitive to incident light, such as a complementary metal-oxide-semiconductor sensor, a charge coupled device sensor, a photodiode, or a photomultiplier. The light detector may be configured to detect an intensity of light. The device may comprise a single light detector, which may be configured to detect a single measurement of light intensity. However, it should be realized that the light detector may comprise an array of light-sensitive elements, such that several measurements of intensity of light may be acquired. This may be used e.g. for determining a spatial distribution of concentration of a substance in a sample.

If the wavelength of illuminated light corresponds to an absorbance peak of the substance, the detected intensity of light may be compared to a calibration measurement so as to determine how much light has been absorbed in the liquid sample. Then, a concentration of the substance in the liquid sample may be determined using the Beer-Lambert law or using more advanced computational algorithms, such as a machine learning algorithm.

A wavelength of light used in the measurement may for instance be in the ultraviolet range, in the visible range or in the infrared range of the spectrum.

The analysis cell may have any cross-sectional shape, but may preferably have a constant cross-sectional shape, which facilitates movement of the plunger within the analysis cell. It should thus be realized that the analysis cell may have a circular cross-section defined by a cylindrical wall but may in other embodiments have a square or rectangular cross-section.

The analysis cell or at least wall portions through which light is passed between the light source and the light detector may be formed by quartz walls, in particular if an ultraviolet wavelength is to be used. However, it should be realized that other materials may be used, adapted to the wavelength of light to be used. For instance, if a visible wavelength is to be used, the analysis cell or at least wall portions through which light is passed may be formed by glass walls.

It should be realized that the inlet and outlet can be a common channel that is in fluid connection with the analysis cell. Thus, the liquid sample may be transported into the analysis cell and out of the analysis cell through the same channel. Alternatively, the inlet and outlet may be formed by separate channels.

According to an embodiment, the first portion of the plunger comprises a reference block, which is configured to be arranged in a light path in the analysis cell between the light source and the light detector in a calibration measurement, wherein the reference block is transparent to the light generated by the light source.

Thus, the plunger may also act as a reference block to be used in the calibration measurement. This implies that the plunger combines several functionalities within the same movable unit. The plunger is movable within the analysis cell to allow entry of liquid samples into the analysis cell and to push liquid samples out of the analysis cell. The plunger is further movable within the analysis cell for defining different path lengths through the liquid sample for analysis measurements. The plunger is further movable to arrange a reference block in the light path in the analysis cell for performing a calibration measurement.

The calibration measurement may allow correcting for drift of the analysis measurement, including drift in any part of an optical path for performing the analysis measurement. Drift may mainly relate to drift of the light source, but may also relate to drift of the light detector or drift of transmission of optics between the light source and the light detector, such as transmission being affected by dirt on walls of the analysis cell through which light is transmitted. Thus, the calibration measurement may allow detection of a light intensity received by the light detector when no absorbance occurs in the analysis cell, such that the intensity of light detected in a sample measurement may be compared to the calibration measurement for determining the amount of a substance in the sample. Thanks to regularly performing calibration measurements, the device may provide reliable measurement results over a long period of time.

The reference block may be formed by a material that is transparent to the light generated by the light source. Thus, the reference block may be formed by a homogeneous block of such material. For instance, the reference block may be formed by quartz, in particular if an ultraviolet wavelength is to be used. However, it should be realized that other materials may be used, adapted to the wavelength of light to be used. For instance, if a visible wavelength is to be used, the reference block may be formed by glass.

It should further be realized that the reference block may alternatively be a hollow block that may be filled by a gas or liquid which is transparent to the light generated by the light source. For instance, the reference block may be formed by quartz walls and may be filled by air or pure water.

However, it should be realized that it is not necessary that the plunger comprises a reference block for allowing a calibration measurement to be performed. According to an alternative embodiment, calibration measurements may be performed by introducing a transparent sample into the analysis cell, such as introducing a sample of pure water for performing the calibration measurement. A calibration measurement is enabled using the pure water sample, since the pure water sample does not contain the substance of interest at all. This may in particular be used if the device is to be manually operated, as the user may ensure that a pure water sample is introduced into the analysis cell when a calibration measurement is to be performed.

In this regard, the first portion of the plunger having the first thickness corresponding to the cross-section of the analysis cell may mainly act to ensure that the liquid sample is completely removed when being pushed out of the analysis cell by the plunger.

According to an embodiment, the second portion of the plunger is formed of a material which is transparent to the light generated by the light source.

This implies that the second portion will not absorb light generated by the light source and will hence not affect light measurements by the light detector.

The second portion of the plunger may be formed by a homogeneous block of transparent material. For instance, the second portion may be formed by quartz, in particular if an ultraviolet wavelength is to be used. However, it should be realized that other materials may be used, adapted to the wavelength of light to be used. For instance, if a visible wavelength is to be used, the second portion of the plunger may be formed by glass.

It should further be realized that the second portion of the plunger may alternatively be a hollow block that may be filled by a gas or liquid which is transparent to the light generated by the light source. For instance, the second portion of the plunger may be formed by quartz walls and may be filled by air or pure water.

According to an embodiment, the plunger comprises a third portion, wherein the third portion of the plunger is formed of a material which is transparent to the light generated by the light source and wherein the third portion has a third thickness which is smaller than the second thickness for allowing a third analysis measurement to be performed while the third portion of the plunger is arranged between the light source and the light detector such that light being detected by the light detector is passed through the third portion and through the liquid sample between the third portion of the plunger and a wall of the analysis cell.

Thus, the device may be adapted for adjusting a path length through a liquid sample between at least three different path lengths. This implies that the device provides further versatility for accurately determining a concentration of a substance of interest for large variations of concentrations.

The third portion of the plunger may be formed by a homogeneous block of transparent material. For instance, the third portion may be formed by quartz, in particular if an ultraviolet wavelength is to be used. However, it should be realized that other materials may be used, adapted to the wavelength of light to be used. For instance, if a visible wavelength is to be used, the third portion of the plunger may be formed by glass.

It should further be realized that the third portion of the plunger may alternatively be a hollow block that may be filled by a gas or liquid which is transparent to the light generated by the light source. For instance, the third portion of the plunger may be formed by quartz walls and may be filled by air or pure water.

According to an embodiment, the device further comprises at least one plunger wiper, which is configured to make contact at least with the second portion of the plunger so as to clean a surface of the second portion of the plunger during movement of the plunger.

This implies that the second portion of the wiper may be cleaned in order to avoid that dirt or remains from previous samples affect a current sample to be measured.

The at least one plunger wiper may further be configured to contact the third portion of the plunger so as to clean the surface of the third portion during movement of the plunger.

Two separate plunger wipers may be present for making contact with the second portion and the third portion of the plunger, respectively.

The at least one plunger wiper may be arranged on an inner wall of the analysis cell facing the plunger. The at least one plunger wiper may be arranged at a protrusion of an inner wall of the analysis cell such that the at least one plunger wiper may make contact with the plunger in a position of the plunger for pushing the liquid sample out of the analysis cell. The at least one plunger wiper may further be flexible in order to allow the at least one plunger wiper to flex during movement of the plunger towards pushing the liquid sample out of the analysis cell such that the movement of the plunger is not affected by the at least one plunger wiper.

Movement of the plunger may ensure that the at least one plunger wiper makes contact with the second portion of the plunger and/or the third portion of the plunger to wipe any dirt or residues from the second portion and/or the third portion so as to clean the second portion and the third portion as the plunger is anyway moved through the analysis cell.

According to an embodiment, the plunger is arranged on a shaft, whereby movement of the shaft is configured to control movement of the plunger in the analysis cell.

This implies that the plunger is arranged to facilitate controlling movement of the plunger. The shaft may extend externally to the analysis cell so as to allow controlling movement of the plunger from a location externally to the analysis cell.

According to an embodiment, the plunger is controlled by an actuator for moving the shaft and thereby moving the plunger in the analysis cell.

This implies that an automated control of the plunger may be facilitated. This is useful if the device is to be used in a fully automated operation for repetitive analysis of samples.

The actuator may for instance be a linear actuator for providing a linear movement of the plunger back and forth in the analysis cell.

However, it should be realized that in other embodiments, the shaft may be manually operated for manual movement of the plunger in the analysis cell. Thus, if the device is to be manually operated, the user may move the plunger in the analysis cell via the shaft.

According to an embodiment, the device is configured such that, when the plunger is moved for allowing entry of the liquid sample into the analysis cell, a low pressure is formed in the analysis cell for sucking the liquid sample into the analysis cell.

The low pressure may be formed due to a seal being provided between the plunger and walls of the analysis cell. Thanks to the low pressure being formed by movement of the plunger, there may not be any need of pumps for forcing the liquid sample into the analysis cell. Rather, the liquid sample may be drawn into the analysis cell by the movement of the plunger.

According to an embodiment, the light source comprises at least a first light emitting diode (LED) for emitting light of a first wavelength corresponding to an absorbance peak of the substance to be analyzed.

A LED may be an inexpensive light source for illuminating the liquid sample. The LED may be combined with a filter for ensuring that the liquid sample is illuminated with light in a narrow wavelength band.

However, it should be realized that other light source(s) may be used instead, such as a light source comprising at least one laser for emitting light of the first wavelength.

If the wavelength of illuminated light corresponds to an absorbance peak of the substance, the detected intensity of light may be compared to a calibration measurement so as to determine how much light has been absorbed in the liquid sample. Then, a concentration of the substance in the liquid sample may be determined using the Beer-Lambert law or using more advanced computational algorithms, such as a machine learning algorithm. A more advanced algorithm may for instance correct for non-linearities in the analysis measurement. This implies that a single wavelength may be used for analysis of the liquid sample.

According to an embodiment, the light source further comprises a second LED for emitting light of a second wavelength, wherein absorbance of the substance to be analyzed is substantially lower at the second wavelength than the first wavelength.

The liquid sample may comprise other substances or compounds, which may contribute to absorbance of the first wavelength. Thus, by using a second wavelength, wherein the absorbance of the substance to be analyzed is substantially lower while other substances or compounds may have similar absorbance at the second wavelength, correction for absorption due to presence of other substances or compounds in the liquid sample is possible. Hence, the use of a second LED enables more accurate measurements of a substance of interest in presence of other substances or compounds in the liquid sample.

The first and second light sources may be activated at different times. This implies that the same light detector may be used for detecting an amount of light having passed through the liquid sample for both the first and the second wavelength. This implies that a very simple optical set-up may be used.

However, it should be realized that the light detector may comprise at least two areas, which may be associated with respective filters, for detecting only the first or the second wavelength, respectively. This implies that the first and the second light sources may be simultaneously activated, while allowing light having passed through the liquid sample for both the first and the second wavelength to be separately detected.

It should further be realized that the second LED for emitting the second wavelength may alternatively be used for analyzing a second substance of interest. In this respect, the second LED may not need to be used at all for correcting a measurement of a first substance of interest, but may alternatively be used entirely for measuring a second substance of interest in a corresponding manner as discussed above for the substance of interest being analyzed using the first light source emitting the first wavelength.

According to an embodiment, the light source further comprises a third LED for emitting light of a third wavelength for enabling detected transmittance of light at the first, second, and third wavelengths to be compared for analyzing the substance and/or for analyzing more than one substance in the liquid sample.

Adding a third wavelength may further improve correction for absorption of the first wavelength due to presence of other substances or compounds in the liquid sample. The third wavelength may correspond to another absorbance peak of the substance of interest or may correspond to a wavelength for which the substance of interest has low absorbance. Detection of amount of light having passed the liquid sample for each of the first, second, and third wavelengths may then be used in combination for determining a concentration of the substance of interest in the liquid sample.

Similar to the discussion of the second LED above, each of the first, second, and third wavelengths may alternatively be used for analyzing a first, second, and third substance of interest, respectively.

It should further be realized that, for each substance of interest to be analyzed, more than one wavelength, such as two or three wavelengths, may be used, as discussed above, such that correction for absorption due to presence of other substances or compounds in the liquid sample is possible.

The use of LEDs provides, as mentioned above, inexpensive light sources for illuminating the liquid sample. Further, the LEDs may be activated at different times, such that simple light detector(s) may be used for detecting an amount of light passing the analysis cell. This implies that the device may be provided with a simple and inexpensive optical set-up.

However, it should be realized that it would be possible to use a light source providing a broadband illumination of the liquid sample, in combination with a light detector forming a spectrophotometer for separating light of different wavelengths.

In addition to LEDs being inexpensive in comparison to a broadband light source, LEDs may also have a shorter warmup time and smaller power consumption than the broadband light source, such that analysis may be quicker and may require less power consumption. This may be particularly advantageous if the device is deployed in a remote location to repetitively perform measurements over a long period of time without any need of manual handling of the device or if the device is a hand-held device.

According to an embodiment, the device is configured for determining a concentration of nitrate in the liquid sample, wherein the light source is configured to generate ultraviolet light for illuminating the liquid sample.

Nitrate has a main absorption peak in ultraviolet light around 205 nm. The absorption peak is relatively broad, such that substantial absorption by nitrate extends towards 240 nm. Thus, concentration of nitrate in the liquid sample may advantageously be determined using a first wavelength in the range of 200-240 nm. For instance, LEDs may not be easily available for providing a wavelength at 205 nm and, hence, a first wavelength at e.g. 235 nm may be used. However, for high concentrations of nitrate, another absorption peak of nitrate may be used, such that the first wavelength may be in the range of 280-320 nm, such as at 300 nm. Further, a second wavelength in a range of 240-260 nm, such as a second wavelength at approximately 260 nm, may be used for compensating for absorption due to organic matter in the liquid sample. A third wavelength in a range above 340 nm, such as a third wavelength at approximately 360 nm, may further be used. Thus, a light source generating ultraviolet light may be suitable for determining the concentration of nitrate in the liquid sample.

LEDs providing ultraviolet light are now commercially available, and therefore LEDs may be used for providing the first and the second wavelengths, such that the device may be inexpensive even though ultraviolet light needs to be used for the light-based analysis.

Measurement of concentration of nitrate in water is relevant in many domains, including agriculture, industry, and nature. Therefore, the use of the device for determining the concentration of nitrate ensures that the device is relevant for use in wide-spread applications.

According to a second aspect, there is provided a method for light-based analysis of a substance in a liquid sample, said method comprising:

moving a plunger from a first position within an analysis cell selectively to at least one of a second position and an intermediate position between the first position and the second position within the analysis cell for allowing the liquid sample to be entered into the analysis cell; wherein the plunger comprises a first portion having a first thickness corresponding to a cross-section of the analysis cell and a second portion having a second thickness which is smaller than the first thickness and wherein the plunger, in the intermediate position, is arranged such that the second portion of the plunger is arranged between a light source and a detector; performing an analysis measurement of the liquid sample by illuminating the liquid sample by light generated by the light source and detecting by the detector light having passed the liquid sample in the analysis cell, wherein, in case the plunger is in the second position, the light detector detects light being passed through the liquid sample filling a space between opposite walls of the analysis cell, and wherein, in case the plunger is in the intermediate position, the light detector detects light being passed through the second portion and through the liquid sample between the second portion of the plunger and a wall of the analysis cell; and moving the plunger from the second position or the intermediate position to the first position to push the liquid sample out of the analysis cell.

Effects and features of this second aspect are largely analogous to those described above in connection with the first aspect. Embodiments mentioned in relation to the first aspect are largely compatible with the second aspect.

Thus, the method enables adjustment of the path length through a liquid sample by simply moving the plunger between different positions. Hence, the method is adapted for performing accurate measurements of large variations of concentrations of a substance of interest.

According to an embodiment, the plunger comprises a reference block and wherein the method further comprises performing a calibration measurement while the plunger is in the first position by illuminating the reference block by light generated by the light source and detecting by the detector light having passed the reference block, wherein the reference block is transparent to the light generated by the light source.

This implies that the method may use the plunger to further place a reference block in a light path in the analysis cell between the light source and the light detector in order to facilitate performing a calibration measurement.

According to an embodiment, the method comprises performing a first analysis measurement while the plunger is in the intermediate position and performing a second analysis measurement while the plunger is in the second position.

The first and second analysis measurements may thus be performed for the same sample so as to ensure that a concentration of a substance of interest may be accurately determined using at least one of the first and the second analysis measurements. The two analysis measurements may be quickly performed, such that speed of performing an analysis is not highly affected by performing of two analysis measurements instead of only one. Further, this implies that there is no need of determining whether an accurate determination is possible based on one analysis measurement, before deciding whether to perform another analysis measurement on the liquid sample.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

Figure 1:
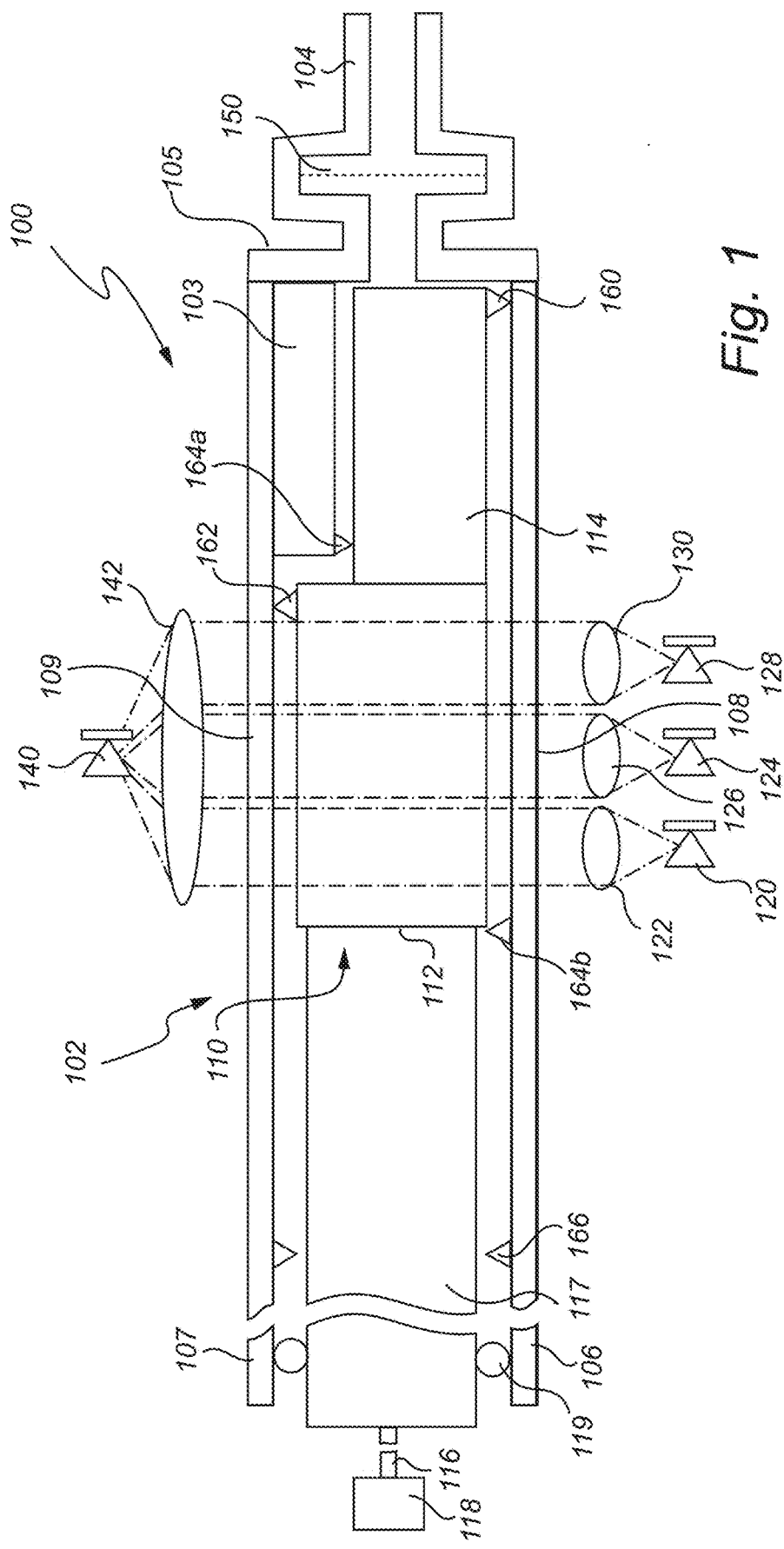
FIG. 1 is a schematic view of a device according to an embodiment showing a plunger in a first position.
Figure 2:
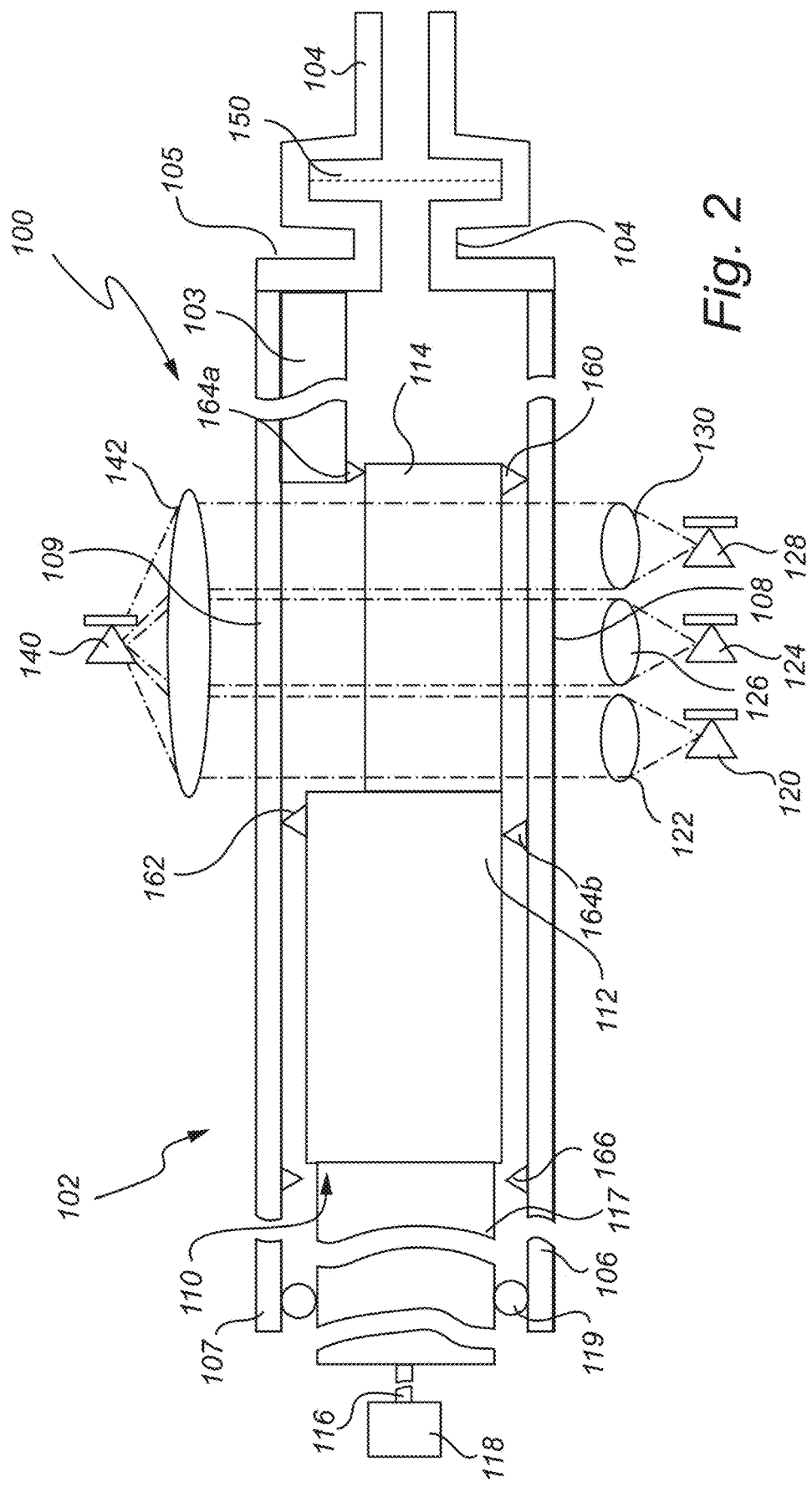
FIG. 2 is a schematic view of the device showing the plunger in an intermediate position.
Figure 3:
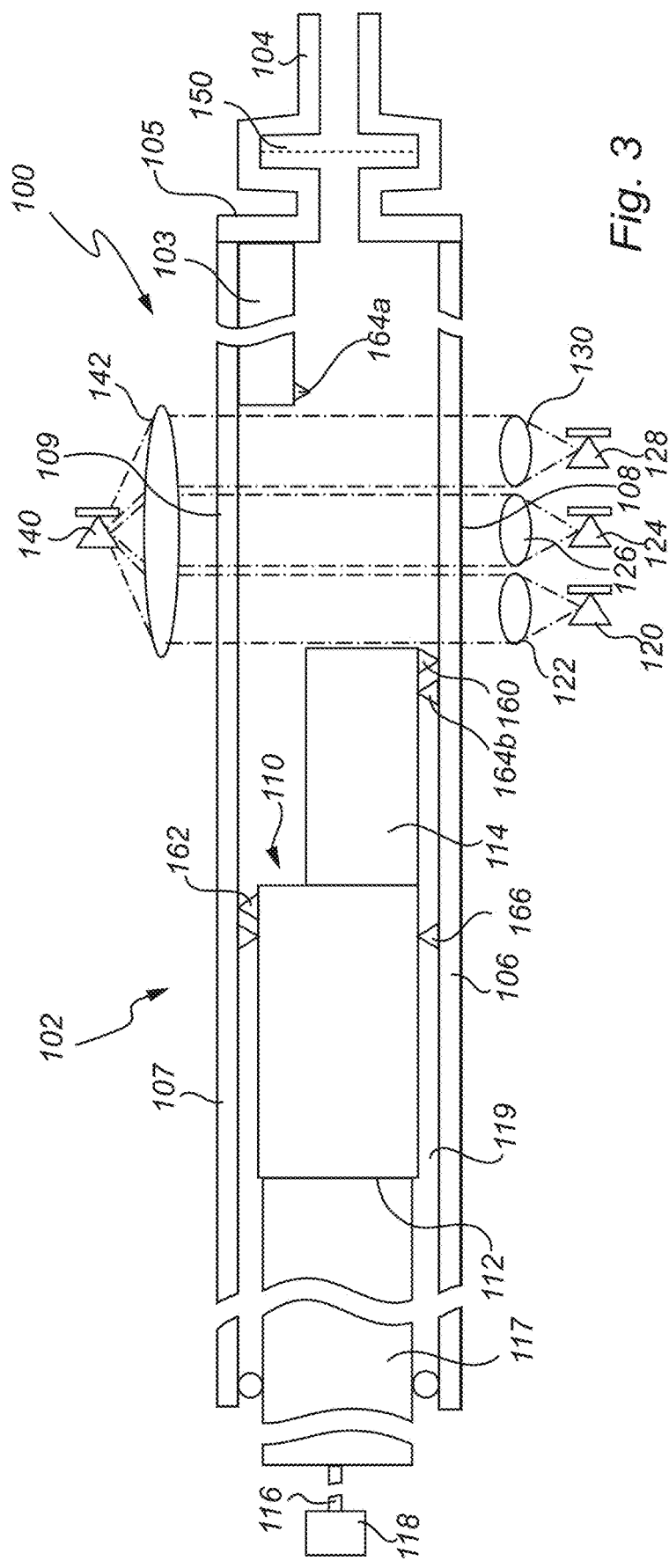
FIG. 3 is a schematic view of the device showing the plunger in a second position.

Referring now to FIGS. 1-3, a device 100 for light-based analysis of a substance in a liquid sample according to an embodiment will be described. The device 100 comprises an analysis cell 102 for holding the liquid sample during analysis. The device 100 further comprises a plunger 110 which is movable within the analysis cell 102. FIG. 1 illustrates a first position of the plunger 110 in the analysis cell, FIG. 3 illustrates a second position of the plunger 110 in the analysis cell and FIG. 2 illustrates an intermediate position of the plunger 110 between the first and second positions.

The device 100 further comprises an inlet and outlet 104 for transporting the liquid sample to and from the analysis cell 102. The inlet and outlet 104 is shown in FIGS. 1-3 as a single inlet/outlet channel, such that the liquid sample is transported to and from the analysis cell 102 through the same channel. However, it should be realized that the inlet and the outlet may be separate channels.

The inlet/outlet channel may be in fluid communication with a liquid for receiving the liquid sample. The inlet/outlet channel may have an end which may be immersed in a liquid reservoir such that a liquid sample may be drawn from the liquid in the liquid reservoir through the inlet/outlet channel into the analysis cell 102. However, it should be realized that the inlet/outlet channel may receive the liquid sample in other manners, such as the inlet/outlet channels being in communication with pipes or other channels for transporting a liquid sample to the analysis cell 102.

Referring now to FIG. 3, analysis of the liquid sample in the analysis cell will initially be described. As shown in FIG. 3, the plunger 110 is arranged in the second position, in which the plunger 110 is fully retracted to allow entry of the liquid sample into the analysis cell 102.

The device 100 further comprises a light source 120 for generating light for illuminating the liquid sample in the analysis cell 102 and a light detector 140 for detecting light. The light detector 140 and the light source 120 are arranged on opposite sides of the analysis cell 102 such that the light detector 140 is configured to detect light having passed through the liquid sample in the analysis cell 102.

The light source 120 may for instance be a light-emitting diode (LED) 120 or a laser, which may be configured to generate light of a relatively narrow wavelength band. Thus, the light source 120 may illuminate the liquid sample using a wavelength of light corresponding to a particular interaction of a substance in the liquid sample with light. For instance, the substance may have high absorbance at the wavelength or may scatter light. However, it should be realized that the light source 120 may be a broadband light source, which may be combined with a filter for passing a particular wavelength towards the liquid sample. Also, it should be realized that in some embodiments, light interaction of the substance is not limited to a narrow wavelength band and the light source 120 may illuminate the substance using a broad range of wavelengths, while still enabling analysis of the substance.

For instance, the substance may exhibit high absorbance over the broad range of wavelengths such as to allow analysis of the substance in the liquid sample.

The light source 120 may be arranged close to the analysis cell 102 to directly illuminate the liquid sample in the analysis cell 102. Alternatively, the light source 120 may be arranged at a distance from the analysis cell 102, for instance in a location which would be practical for arrangement of components of the device 100 and light from the light source 120 may be guided by waveguides and other optical components to the analysis cell 102. As illustrated in FIGS. 1-3, the light source 120 may be combined with a lens 122 for forming a collimated beam of light through the analysis cell 102.

As further illustrated in FIGS. 1-3, the device 100 may comprise a plurality of light sources 120, 124, 128. Each of the light sources 120, 124, 128 may be of a common type, e.g. LEDs, but arranged to generate light of different wavelengths. Each light source 120, 124, 128 may be associated with optics for guiding light and/or forming light towards the analysis cell 102, as illustrated by lenses 122, 126, 130.

Thus, a first LED 120 and a second LED 124 may be provided for illuminating the liquid sample with different wavelengths. The first wavelength of the first LED 120 may correspond to an absorbance peak of a substance of interest in the liquid sample. Then, the intensity of light detected by the light detector 140 may be compared to a calibration measurement so as to determine how much light has been absorbed in the liquid sample. Then, a concentration of the substance in the liquid sample may be determined using the Beer-Lambert law or using more advanced computational algorithms, such as a machine learning algorithm.

The liquid sample may comprise other substances or compounds, which may contribute to absorbance of the first wavelength. Thus, by using a second wavelength generated by the second LED 124, wherein the absorbance of the substance to be analyzed is substantially lower while other substances or compounds may have similar absorbance at the second wavelength, correction for absorption due to presence of other substances or compounds in the liquid sample is possible. Hence, the use of a second LED 124 enables more accurate measurements of a substance of interest in presence of other substances or compounds in the liquid sample.

It should further be realized that the second LED 124 for emitting the second wavelength may alternatively be used for analyzing a second substance of interest. In this respect, the second LED 124 may not need to be used at all for correcting a measurement of a first substance of interest, but may alternatively be used entirely for measuring a second substance of interest in a corresponding manner as discussed above for the substance of interest being analyzed using the first LED 120 emitting the first wavelength.

As further illustrated in FIGS. 1-3, a third LED 128, which may also be associated with a lens 130, may further be provided. The third LED 128 may illuminate the liquid sample with a third wavelength, different from the first and second wavelengths.

Adding a third wavelength may further improve correction for absorption of the first wavelength due to presence of other substances or compounds in the liquid sample. The third wavelength may correspond to another absorbance peak of the substance of interest or may correspond to a wavelength for which the substance of interest has low absorbance. Detection of amount of light having passed the liquid sample for each of the first, second, and third wavelengths may then be used in combination for determining a concentration of the substance of interest in the liquid sample. The first, second, and third LEDs 120, 124, 128 may be activated at different times. This implies that the same light detector 140 may be used for detecting an amount of light having passed through the liquid sample for each of the first, second, and third wavelengths. This implies that a very simple optical set-up may be used.

As shown in FIGS. 1-3, the first, second, and third LEDs 120, 124, 128 and associated optics 122, 126, 130 may be arranged to define parallel light paths through the analysis cell 102. The light paths may be close to each other such that light from each of the light paths passing through the analysis cell 102 may be detected by the same light detector 140. As shown in FIGS. 1-3, the light detector 140 may be associated with a lens 142 for capturing light from each of the light paths and focusing the light onto the light detector 140 that is sensitive to incident light. The optics associated with the first, second, and third LEDs 120, 124, 128 may alternatively be configured such that the same light path is used through the analysis cell 102 for each of the wavelengths. This may be achieved for instance by each of the LEDs 120, 124, 128 being associated with a waveguide that outputs light to a common optical component, such as a lens, for transferring light through the analysis cell 102. Use of a common light path through the analysis cell 102 may simplify light collection at the light detector 140.

However, it should be realized that the light from the different light paths associated with the first, second, and third LEDs 120, 124, 128 may alternatively be detected by different light-sensitive sensors. In this regard, detections of light intensity using each of the first, second, and third LEDs 120, 124, 128 may be simultaneously performed. However, in order to avoid crosstalk between the light paths, each light-sensitive sensor may be associated with a filter so as to only allow the relevant wavelength to pass to the light-sensitive sensor.

The light detector 140 may be any type of detector sensitive to incident light, such as a complementary metal-oxide-semiconductor sensor, a charge coupled device sensor, a photodiode, or a photomultiplier. The light detector 140 may be configured to detect an intensity of light. The device may comprise a single light detector, which may be configured to detect a single measurement of light intensity. However, it should be realized that the light detector may comprise an array of light-sensitive elements, such that several measurements of intensity of light may be acquired. This may be used e.g. for determining a spatial distribution of concentration of a substance in a sample.

As mentioned above, the light detector 140 may be associated with optics 142 for collecting light and guiding light towards the light detector 140. The optics 142 may be configured to collect light in a location very close to the analysis cell 102 for capturing light passing through the analysis cell 102. However, the light detector 140 may be associated with waveguides for guiding the collected light to the light detector 140 such that the light detector 140 may be arranged in a location which would be practical for arrangement of components of the device 100.

The light detector 140 may be configured to output a detected intensity of light to a processing unit for further processing of the detected intensity of light, such as analyzing a substance in the liquid sample based on detected intensities of light.

The processing unit may be arranged in the device 100 and may be implemented as a general-purpose processing unit, such as a central processing unit (CPU), which may execute the instructions of one or more computer programs in order to implement functionality of the processing unit.

The processing unit may alternatively be implemented as firmware arranged e.g. in an embedded system, or as a specifically designed processing unit, such as an Application-Specific Integrated Circuit (ASIC) or a Field-Programmable Gate Array (FPGA), which may be configured to implement functionality of the processing unit.

A wavelength of light used in the measurement may for instance be in the ultraviolet range, in the visible range or in the infrared range of the spectrum.

In an embodiment, the device 100 is configured for determining a concentration of nitrate in a water sample. In this embodiment, the device 100 may be configured to use a first wavelength in a range of 200-240 nm, which corresponds to a main absorbance peak of nitrate. For instance, a first wavelength at 235 nm may be used. However, for high concentrations of nitrate, another absorption peak of nitrate may be used, such that the first wavelength may be in the range of 280-320 nm, such as at 300 nm.

The device 100 may further be configured to use a second wavelength at approximately 240-260 nm, which corresponds to low absorbance of nitrate. Use of the second wavelength may be useful in order to allow correction for absorbance due to organic compounds in the water sample, which have also relatively high absorbance at the second wavelength.

Further, a third wavelength may be used in order to further improve accuracy of determined concentrations of nitrate. The third wavelength may be in a range above 340 nm, such as a third wavelength at 360 nm, which also corresponds to a low absorbance of nitrate.

It should be realized that the device 100 may alternatively be used for determining presence or concentration of other substances in other liquid samples, for example for determining concentration of dissolved organic carbon. The wavelengths generated by the light source(s) of the device 100 may be adapted to absorbance peaks of the substance of interest and other substances expected to be present in the liquid sample. Further, the device 100 may comprise tunable light source(s) such that the wavelength generated by the light source(s) may be tuned. Thus, the same device 100 may be set up for different types of analyses based on a selection of wavelengths being used.

The device 100 may further comprise a selective membrane 150 in the inlet 104 of the device 100 for allowing the substance of interest to pass through the selective membrane 150 while blocking other compounds from passing through the selective membrane 150 to the analysis cell 102.

This implies that other substances or compounds which may affect analysis of a substance of interest may be filtered by the selective membrane 150 such that the other substances or compounds do not reach the analysis cell 102. This implies that other substances or compounds which have an absorption peak coinciding with an absorption peak of the substance of interest are not present in the analysis cell or at least not present in a high concentration and therefore accuracy of measurements of the substance of interest are improved.

The membrane 150 may have pores or openings with sizes fitted to pass through the substance of interest while blocking at least part of other substances or compounds that may affect the measurements.

As illustrated in FIGS. 1-3, the plunger 110 may be configured to move between the first position shown in FIG. 1, the intermediate position shown in FIG. 2 and the second position shown in FIG. 3.

The plunger 110 may be configured to fit closely to a cross-section of the analysis cell 102. Thus, at least a portion of the plunger 110 may almost entirely fill a space between inner walls of the analysis cell 102.

The plunger 110 may be movable within the analysis cell 102 along the walls of the analysis cell 102. The analysis cell 102 may have a constant cross-section to facilitate movement of the plunger 110 along the walls of the analysis cell 102.

In the first position, the plunger 110 may extend far into the analysis cell 102 to make contact or almost make contact with a wall 105 at a short side of the analysis cell 102, in which an opening to the inlet and outlet 104 into the analysis cell 102 is provided. Thus, when moved into the first position, the plunger 110 may push a liquid sample out of the analysis cell 102.

The plunger 110 may further comprise a first portion 112, which may form a reference block 112. The plunger 110 may be configured to arrange the reference block 112 in the light path between the LED(s) 120, 124, 128 and the light detector 140 through the analysis cell 102 when the plunger 110 is arranged in the first position. The device 100 may be configured to perform calibration measurement(s) for each of the LED(s) 120, 124, 128 by passing light through the reference block 112.

The calibration measurement may allow correcting for drift of the light sources 120, 124, 128. Thus, the calibration measurement may allow detection of a light intensity received by the light detector 140 when no absorbance occurs in the analysis cell 102, such that the intensity of light detected in a sample measurement may be compared to the calibration measurement for determining the amount of a substance in the sample. Thanks to regularly performing calibration measurements, the device 100 may provide reliable measurement results over a long period of time.

The reference block 112 may be formed by a material that is transparent to the light generated by the light source 120, 124, 128. Thus, the reference block 112 may be formed by a homogeneous block of such material. For instance, the reference block may be formed by quartz, in particular if an ultraviolet wavelength is to be used. However, it should be realized that other materials may be used, adapted to the wavelength of light to be used. For instance, if a visible wavelength is to be used, the reference block 112 may be formed by glass.

It should further be realized that the reference block 112 may alternatively be a hollow block that may be filled by a gas or liquid which is transparent to the light generated by the light source 120, 124, 128. For instance, the reference block 112 may be formed by quartz walls and may be filled by air or pure water.

When the plunger 110 is moved from the first position to the intermediate position as illustrated in FIG. 2, the plunger 110 allows entry of the liquid sample into the analysis cell 102.

The plunger 110 may further comprise a second portion 114, having a thickness in a direction along the light path between the light source 120 and the light detector 140, which thickness is smaller than the thickness of the first portion 112 of the plunger 110.

The plunger 110 may be configured to arrange the second portion 114 in the light path between the LED(s) 120, 124, 128 and the light detector 140 through the analysis cell 102 when the plunger 110 is arranged in the intermediate position. This implies that a short path length through the liquid sample is defined in the intermediate position.

The second portion 114 of the plunger 110 may be configured not to absorb the wavelength of light generated by the light source(s) 120, 124, 128 so as to ensure that the second portion 114 of the plunger 110 does not affect the measurement by the light detector 140. Hence, an amount of light detected by the light detector 140 may be contributed to the liquid sample having a short path length when a first analysis measurement is performed in the intermediate position of the plunger 110.

The second portion 114 of the plunger 110 may be formed by a homogeneous block of transparent material. For instance, the second portion 114 may be formed by quartz, in particular if an ultraviolet wavelength is to be used. However, it should be realized that other materials may be used, adapted to the wavelength of light to be used. For instance, if a visible wavelength is to be used, the second portion 114 of the plunger 110 may be formed by glass.

It should further be realized that the second portion 114 of the plunger 110 may alternatively be a hollow block that may be filled by a gas or liquid which is transparent to the light generated by the light source 120, 124, 128. For instance, the second portion 114 of the plunger 110 may be formed by quartz walls and may be filled by air or pure water.

When the plunger 110 is moved to the second position, the plunger 110 is in a completely retracted position such that no part of the plunger 110 is in the light paths defined through the analysis cell 102. The plunger 110 in the second position allows entry of the liquid sample completely into the analysis cell 102. This implies that a light path in the analysis cell 102 between the light source(s) 120, 124, 128 and the light detector 140 is completely filled by the liquid sample so as to define a long path length through the analysis cell 102. Hence, an amount of light detected by the light detector 140 may be contributed to the liquid sample having a long path length when a second analysis measurement is performed in the second position of the plunger 110.

Hence, the device 100 provides for simple adjustment of the path length to be used through the liquid sample in the first and second analysis measurements, respectively. For samples having a high concentration of a substance of interest, a short path length may be needed in order to ensure that not all light is absorbed before reaching the light detector. For samples having a low concentration of a substance of interest, a long path length may be needed, because absorption of the liquid sample may otherwise be too small to measure. For an individual sample, one or both of the first and second analysis measurements may be performed.

As illustrated in FIG. 1, the plunger 110 may be arranged on a shaft illustrated as having a thick cross-section 117 attached to the plunger 110 and a narrow cross-section 116. Movement of the shaft 116, 117 is configured to control movement of the plunger 110 in the analysis cell 102. The shaft 116, 117 may extend externally to the analysis cell 102 so as to allow controlling movement of the plunger 110 from a location externally to the analysis cell.

The plunger 110 may be controlled by an actuator 118 for moving the shaft 116, 117 and thereby moving the plunger 110 in the analysis cell 102. The actuator 118 may be controlled by a motor such that an automated control of the plunger 110 may be facilitated. This is useful if the device 100 is to be used in a fully automated operation for repetitive analysis of samples.

The actuator 118 may for instance be a linear actuator for providing a linear movement of the plunger 110 back and forth in the analysis cell 102. However, it should be realized that in other embodiments, the shaft 116, 117 may be manually operated for manual movement of the plunger 110 in the analysis cell. Thus, if the device 100 is to be manually operated, the user may move the plunger 110 in the analysis cell 102 via the shaft 116, 117.

The plunger 110 may comprise one or more mechanical guiding elements 119 for aiding movement of the plunger 110 in the analysis cell 102. The mechanical guiding elements 119 may make contact with the thick cross-section 117 of the shaft and a wall of the analysis cell 102. However, according to an alternative embodiment, the mechanical guiding elements 119 may make contact with both the plunger 110 and a wall of the analysis cell 102. For instance, the mechanical guiding element 119 may be in the form of an O-ring, which may be mounted on the plunger 110 or on a wall of the analysis cell 102 such that the plunger 110 or the wall of the analysis cell slides in relation to the O-ring when the plunger 110 is moved along the wall of the analysis cell 102.

The analysis cell 102 may have side walls 106, 107 which together with the wall 105 at the short side of the analysis cell 102 and the plunger 110 defines a sample chamber in which a liquid sample may be received. The analysis cell 102 may have any shape but may preferably have a regular shape of the side walls 106, 107, such as to form a rectangular, such as square, cross-section. It should be realized that the analysis cell 102 may have a circular or elliptic cross-section, such that a single side wall may surround the sample chamber.

The O-ring 119 may also provide a seal for sealing the sample chamber. The sealing of the sample chamber may allow the liquid sample to be drawn into the analysis cell 102 by a low pressure being formed in the analysis cell 102. The sealing of the sample chamber may also ensure that contamination via a spacing between the plunger 110 and the walls 106, 107 of the analysis cell 102 is avoided. However, it should be realized that sealing of the sample chamber may be achieved in alternative ways.

As mentioned above, the light source(s) 120, 124, 128 and the light detector 140 may be arranged on opposite sides of the analysis cell 102. Thus, a light path may be defined through the analysis cell 102. The analysis cell 102 may comprise a first wall portion 108 associated with the light source(s) 120, 124, 128 for allowing light from the light source(s) 120, 124, 128 into the sample chamber, and a second wall portion 109 associated with the light detector 140 for allowing light to leave the sample chamber to be collected for detection by the light detector 140. The first and second wall portions 108, 109 may thus be at opposite ends of a light path through the sample chamber. For instance, if the analysis cell 102 has a rectangular cross-section, the first and second wall portions 108, 109 may be on opposing side walls 106, 107 as illustrated in FIGS. 1-3. However, if the analysis cell 102 has a circular cross-section, the first and second wall portions 108, 109 may be arranged on diametrically opposite locations in the single side wall of the analysis cell 102.

The first and second wall portions 108, 109 should allow light to be passed through the walls 106, 107 of the analysis cell 102, so as to allow the light-based measurement to be performed on the liquid sample in the analysis cell 102. The first and second wall portions 108, 109 should therefore be transparent or at least translucent to the light generated by the light source(s) 120, 124, 128 such that the light from the light source(s) 120, 124, 128 may pass through the first wall portion 108 into the sample chamber and further through the second wall portion 109 to be detected by the light detector 140.

The first and second wall portions 108, 109 may have different properties than the rest of the walls 106, 107 in which the first and second wall portions 108, 109 are arranged. Thus, the first and second wall portions 108, 109 may form windows in the walls 106, 107 of the analysis cell 102 through which light is allowed to pass. However, according to an alternative, the entire walls 106, 107 of the analysis cell 102 may be formed by a material that is transparent or translucent to the wavelength of light used and the first and second wall portions 108, 109 are the portions of the walls 106, 107 arranged in relation to the light source(s) 120, 124, 128 and the light detector 140 such that light passes through the first wall portion 108 into the analysis cell 102 and through the second wall portion 109 out of the analysis cell 102.

For instance, the walls 106, 107 of the analysis cell 102 or at least the first and second wall portions 108, 109 may be formed by quartz, in particular if an ultraviolet wavelength is to be used. However, it should be realized that other materials may be used, adapted to the wavelength of light to be used. For instance, if a visible wavelength is to be used, the walls 106, 107 of the analysis cell 102 or at least the first and second wall portions 108, 109 may be formed by glass walls.

As illustrated in FIG. 1, in the first position of the plunger 110, the second portion 114 of the plunger 110 may make contact with the wall 105 at the short side of the analysis cell 102. Since the second portion 114 of the plunger 110 does not fill an entire cross-section of the analysis cell 102, the analysis cell 102 may have a protrusion 103 at a side wall 107 extending into the sample chamber. This implies that the cross-section of the analysis cell 102 may be smaller at the end closest to the short end of the analysis cell 102 such that the cross-section may be entirely filled by the second portion 114 of the plunger 110. The smaller cross-section of the analysis cell 102 may have a length corresponding to a length of the second portion 114 of the plunger 110 such that the first portion 112 of the plunger 110 may make contact with the protrusion 103 in the first position of the plunger 110 such that no remains of the liquid sample may stay in the sample chamber when the liquid sample is to be pushed out of the analysis cell 102 by moving the plunger 110 to the first position. There may be a further outlet channel through the protrusion 103 for allowing part of the liquid sample to be pushed out of the analysis cell 102 through the further outlet channel.

The device 100 may further comprise at least one wiper, illustrated in FIGS. 1-3 as a first wiper 160 and a second wiper 162. As shown in FIGS. 1-3, the first wiper 160 is arranged on the plunger 110 facing the side wall 106 comprising the first wall portion 108, and the second wiper 162 is arranged on the plunger 110 facing the side wall 107 comprising the second wall portion 109.

The first and second wipers 160, 162 are arranged on the plunger 110 so as to make contact with the respective side wall 106, 107 during movement of the plunger 110. The first and second wipers 160, 162 may be configured to clean the first and second wall portions 108, 109, respectively, as the first and second wipers 160, 162 are moved across the first and second wall portions 108, 109 during movement of the plunger 110.

The first and second wipers 160, 162 may each be formed by a flexible material to allow movement of the plunger 110, while the first and second wipers 160, 162 make contact with the walls 106, 107 of the analysis cell 102. The first and second wipers 160, 162 may thus slide with friction over a surface of the analysis cell 102. The first and second wipers 160, 162 may further be sticky so that any residues from liquid samples remaining on the first and second wall portions 108, 109 are wiped off the first and second wall portions 108, 109. For instance, the first and second wipers 160, 162 may be formed by rubber material.

This implies that the first and second wall portions 108, 109 may be cleaned when the plunger 110 is moved between the first and second positions, such that the light-based measurements are not affected by residue or dirt on the first and second wall portions 108, 109.

As an alternative to having a first and a second wiper 160, 162 arranged for cleaning the first and the second wall portion 108, 109, respectively, the device 100 may comprise a wiper that extends around the plunger 110 so as to make contact with the analysis cell 102 along an entire circumference of the plunger 110. Thus, a single wiper may be used for cleaning both the first wall portion 108 and the second wall portion 109.

The liquid sample may be drawn into the analysis cell 102 by a low pressure being formed in the analysis cell 102. This may be achieved by the wiper(s) sealing the sample chamber by forming a contact with walls of the analysis cell 102 around the entire circumference of the plunger 110. Alternatively, a low pressure may be formed in the analysis cell 102 by the above-mentioned O-ring forming a seal of the sample chamber. Thus, when the plunger 110 is moved from the first position, a liquid sample may be drawn into the analysis cell 102.

The device 100 may further comprise at least one reference block wiper 166, which is configured to make contact with the reference block 112 during movement of the plunger 110 so as to clean a surface of the reference block 112 during movement of the plunger 110.

Thus, the reference block 112 may also be cleaned during movement of the plunger 110. This may ensure that dirt or residues from liquid samples do not stick to surfaces of the reference block 112 such that calibration measurements may be affected. Rather, the reference block wiper 166 may clean the surfaces of the reference block 112.

The at least one reference block wiper 166 may be formed by a flexible material to allow movement of the plunger 110, while the at least one reference block wiper 166 arranged on the analysis cell 102 makes contact with the plunger 110. The at least one reference block wiper 166 may thus slide with friction over a surface of the plunger 110. The at least one reference block wiper 166 may further be sticky so that any residues remaining on the reference block 112 are wiped off the reference block. For instance, the at least one reference block wiper 166 may be formed by rubber material.

The at least one reference block wiper 166 may be arranged on an inner wall 106, 107 of the analysis cell 102 facing the reference block 112. The at least one reference block wiper 166 may be arranged at a location in the analysis cell 102 such that the at least one reference block wiper 166 may make contact with the reference block 112 in a retracted position of the reference block 112, between the first position and the second position of the plunger 110 when a liquid sample is allowed to enter the analysis cell 102.

It should be realized that the device 100 may comprise one reference block wiper 166, which is configured to extend at least partially along a circumference of the inner wall of the analysis cell 102 so as to make contact with opposite sides of the reference block 112, which will be in front of the first and the second wall portions 108, 109 when the plunger 110 is moved through the analysis cell 102. Alternatively, the device 100 may comprise two reference block wipers 166, each arranged on an inner wall of the analysis cell 102 so as to make contact with one side each of the reference block 112. According to yet another alternative, plunger wiper 164b described below may also function as a reference block wiper making contact with the reference block 112 between the first and the second position of the plunger 110. In this regard, it may be sufficient to have only one reference block wiper 166 arranged on the inner wall 107 of the analysis cell 102, the reference block wiper 166 being dedicated to clean a surface of the reference block facing the inner wall 107. The surface of the reference block facing the other inner wall 106 may be cleaned by the plunger wiper 164b, which is also used for cleaning a surface of the second portion 114 of the plunger 110.

The device 100 may further comprise at least one plunger wiper 164a, 164b, which is configured to make contact with the second portion 114 of the plunger 110 so as to clean a surface of the second portion 114 of the plunger 110 during movement of the plunger 110.

This implies that the second portion 114 of the plunger 110 may be cleaned in order to avoid that dirt or remains from previous samples affect a current sample to be measured.

The at least one plunger wiper 164a, 164b may be arranged on an inner wall 106, 107 of the analysis cell 102 facing the plunger 110. One plunger wiper 164a may be arranged at the protrusion 103 of the analysis cell 102 such that the plunger wiper 164a may make contact with the plunger 110 in the first position of the plunger 110. Another plunger wiper 164b may be arranged on the inner wall 106 of the analysis cell 102 facing the plunger 110. The plunger wiper 164b may be arranged at a location in the analysis cell 102 such that the plunger wiper 164b may make contact with the second portion 114 of the plunger 110 in a retracted position of the plunger 110, between the first position and the second position of the plunger 110 when a liquid sample is allowed to enter the analysis cell 102.

The at least one plunger wiper 164a, 164b may further be flexible in order to allow the at least one plunger wiper 164a, 164b to flex during movement of the plunger 110 towards pushing the liquid sample out of the analysis cell 102 such that the movement of the plunger 110 is not affected by the at least one plunger wiper 164a, 164b. The at least one plunger wiper 164a, 164b may thus slide with friction over a surface of the second portion 114 of the plunger 110. The at least one plunger wiper 164a, 164b may further be sticky so that any residues remaining on the second portion 114 are wiped off the second portion 114. For instance, the at least one plunger wiper 164a, 164b may be formed by rubber material.

Figure 4:
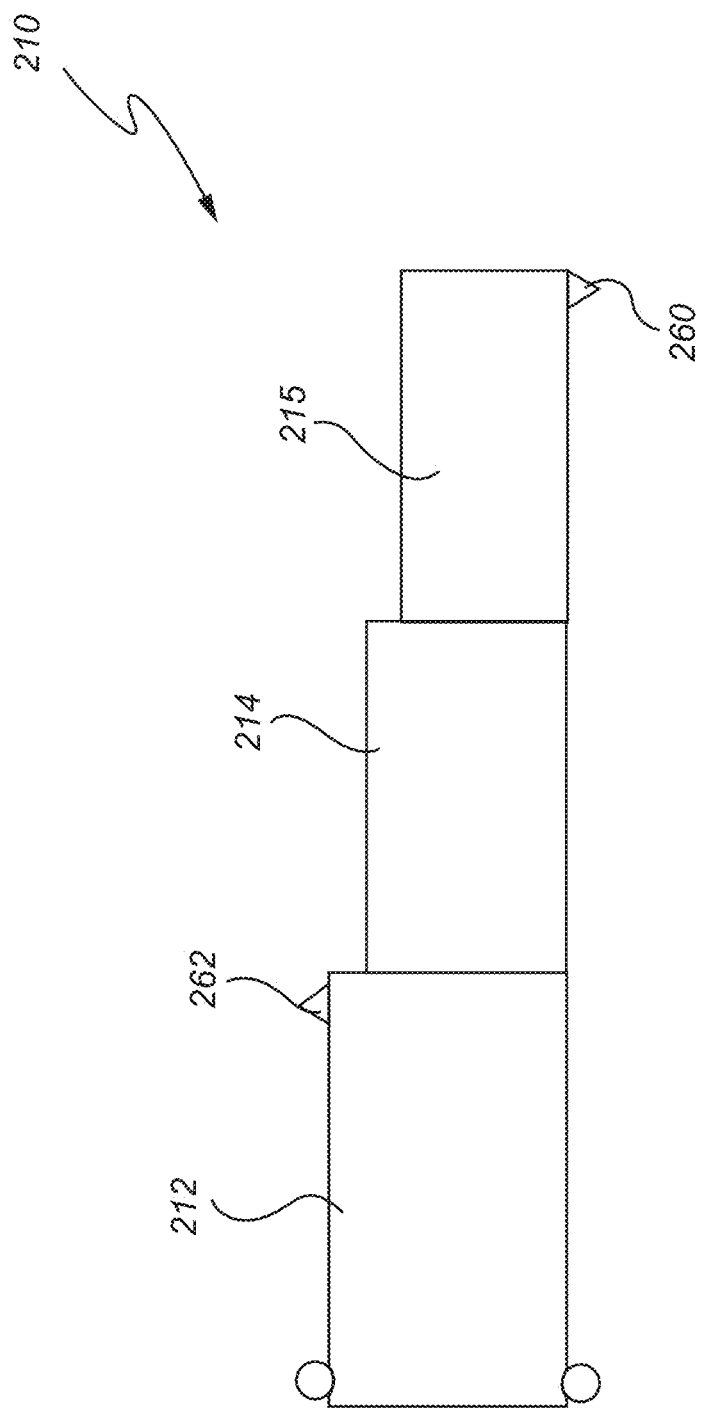
FIG. 4 is a schematic view of a plunger according to a second embodiment.

Referring now to FIG. 4, a plunger 210 of the device 100 according to another embodiment will be described.

As shown in FIG. 4, the plunger 210 may comprise a first portion 212 corresponding to the first portion 112 described above in relation to FIGS. 1-3 and a second portion 214 corresponding to the first portion 112 described above in relation to FIGS. 1-3. However, the plunger 210 may further comprise a third portion 215. The first portion 212, second portion 214 and third portion 215 may be arranged in sequence along a direction of movement of the plunger 210 in the analysis cell 102.

The device 100 may further comprise at least one wiper, illustrated in FIG. 4 as a first wiper 260 and a second wiper 262 corresponding to the first wiper 160 and the second wiper 162 described above in relation to FIGS. 1-3.

The third portion 215 may have a thickness in a direction along the light path between the light source 120 and the light detector 140, which thickness is smaller than the thicknesses of the first portion 212 and second portion 214 of the plunger 210. Thus, the third portion 215 may be used for defining yet another path length through a liquid sample in the analysis cell 102, in addition to the path length defined by the second portion 214 and the path length defined between opposing walls of the analysis cell 102.

For instance, a device 100 provided with the plunger 210 may enable measurements using path lengths of 1 mm, 3 mm, and 10 mm through the liquid sample.

The plunger 210 may be configured to arrange the second portion 214 in the light path between the LED(s) 120, 124, 128 and the light detector 140 through the analysis cell 102 when the plunger 210 is arranged in a first intermediate position and to arrange the third portion 215 in the light path between the LED(s) 120, 124, 128 and the light detector 140 through the analysis cell 102 when the plunger 210 is arranged in a second intermediate position between the first position of the plunger 210, wherein the plunger 210 may push a liquid sample out of the analysis cell 102, and the second position of the plunger 210, wherein the plunger 210 is in a completely retracted position such that no part of the plunger 210 is in the light paths defined through the analysis cell 102. This implies that two different path lengths through the liquid sample are defined in the first and second intermediate positions.

Like the second portion 214 of the plunger 210, the third portion 215 of the plunger 210 may be configured not to absorb the wavelength of light generated by the light source (s) 120, 124, 128 so as to ensure that the third portion 215 of the plunger 210 does not affect the measurement by the light detector 140. Hence, an amount of light detected by the light detector 140 may be contributed to the liquid sample having a medium path length (a short path length being defined when the second portion 214 is arranged in the light path and a long path length being defined when the plunger 210 is in the second position) when an analysis measurement is performed in the second intermediate position of the plunger 210.

The third portion 215 of the plunger 210 may be formed by a homogeneous block of transparent material. For instance, the third portion 215 may be formed by quartz, in particular if an ultraviolet wavelength is to be used. However, it should be realized that other materials may be used, adapted to the wavelength of light to be used. For instance, if a visible wavelength is to be used, the third portion 215 of the plunger 210 may be formed by glass.

It should further be realized that the third portion 215 of the plunger 210 may alternatively be a hollow block that may be filled by a gas or liquid which is transparent to the light generated by the light source 120, 124, 128. For instance, the third portion 215 of the plunger 210 may be formed by quartz walls and may be filled by air or pure water.

It should be further realized that in other embodiments, the plunger may comprise even further portions, in addition to the second and third portions with yet different thicknesses for defining even further different path lengths through the liquid sample.

In the first position of the plunger 210, the third portion 215 of the plunger 210 may make contact with the wall 105 at the short side of the analysis cell 102. Similar to the embodiment discussed in relation to FIGS. 1-3, the analysis cell 102 may have a protrusion 103 at a side wall 107 extending into the sample chamber, which would fit with a shape of the second and third portions 214, 215 of the plunger 210 such that the first portion 212 of the plunger 210 may make contact with the protrusion 103 in the first position of the plunger 210 such that there is no void left between the wall 105 and the plunger 210 and no remains of the liquid sample may stay in the sample chamber when the liquid sample is to be pushed out of the analysis cell 102 by moving the plunger 210 to the first position. There may be a further outlet channel through the protrusion 103 for allowing part of the liquid sample to be pushed out of the analysis cell 102 through the further outlet channel.

The at least one plunger wiper may further be configured to contact the third portion 215 of the plunger 210 so as to clean the surface of the third portion 215 during movement of the plunger 210. Two separate plunger wipers may be present for making contact with the second portion 214 and the third portion 215 of the plunger 210, respectively.

Figure 5:
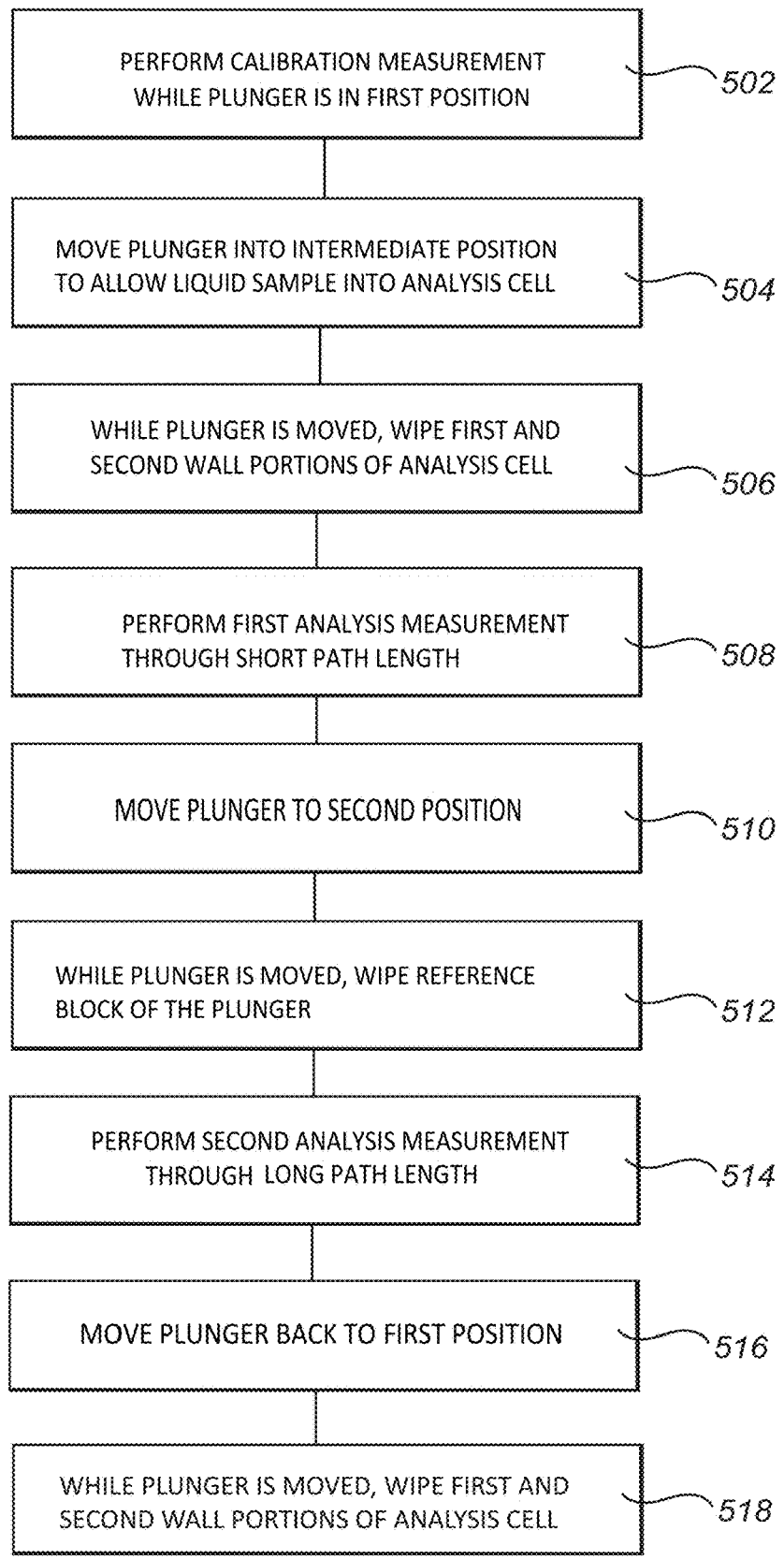
FIG. 5 is a flow chart of a method according to an embodiment.

Referring now to FIG. 5, a method for light-based analysis of a substance in a liquid sample according to an embodiment will be discussed.

The device 100 may comprise a controller for sending command signals to components of the device 100 so as to control the device 100 to perform the method. The controller may further receive measurement results from the light detector 140 for analysis of a liquid sample. Thus, the device 100 may be fully automated by the controller executing software instructions for controlling performing of the method. Alternatively, the controller may be at least partly controlled by a user through a user interface.

The method starts with the plunger 110 being at the first position. At this position, each of the LEDs 120, 124, 128 is sequentially turned on while the other LEDs are off, and a measurement is made by the light detector 140 for light passing through the reference block 112 for each of the LEDs 120, 124, 128 so as to perform 502 a calibration measurement for each light source.

Then, the plunger 110 is moved 504 to an intermediate position of the plunger 110 in the analysis cell 102. The movement of the plunger 110 allows a liquid sample to be entered into the analysis cell 102. In the intermediate position of the plunger 110, the second portion 114 of the plunger 110 is arranged in the light path through the analysis cell 102 to define a short path length through the liquid sample.

While the plunger 110 is moved from the first position to the intermediate position, the first and second wall portions 108, 109 of the analysis cell 102 are wiped 506 using the at least one wiper 160, 162. Thus, the first and second wall portions 108, 109 are cleaned. Further, while the plunger 110 is moved from the first position to the intermediate position, the second portion 114 of the plunger is wiped using the at least one plunger wiper 164a. Thus, the second portion 114 of the plunger 110 is cleaned.

When the plunger 110 is in the intermediate position, a first analysis measurement is performed 508 through the short path length. The first analysis measurement comprises sequentially turning the LEDs 120, 124, 128 on while the other LEDs 120, 124, 128 are off, and a measurement is made by the light detector 140 for light passing through the short path length of the liquid sample for each of the LEDs 120, 124, 128. The first analysis measurement may be used in combination with the calibration measurement to determine a concentration of a substance of interest in the liquid sample, for a high concentration of the substance of interest.

Then, the plunger 110 is moved 510 to the second position of the plunger 110 in the analysis cell 102, wherein the plunger 110 is in a completely retracted position in the analysis cell 102 such that no part of the plunger 110 is in the light paths defined through the analysis cell 102. The movement of the plunger 110 allows a liquid sample to be further entered into the analysis cell 102. In the second position of the plunger 110, a long path length through the liquid sample is defined between opposing walls of the analysis cell 102.

While the plunger 110 is moved to the second position, the reference block 112 of the plunger is wiped 512 using the at least one reference block wiper 166. Thus, the reference block 112 of the plunger 110 is cleaned.

When the plunger 110 is in the second position, a second analysis measurement is performed 514 through the long path length. The second analysis measurement comprises sequentially turning the LEDs 120, 124, 128 on while the other LEDs 120, 124, 128 are off, and a measurement is made by the light detector 140 for light passing through the long path length of the liquid sample for each of the LEDs 120, 124, 128. The second analysis measurement may be used in combination with the calibration measurement to determine a concentration of a substance of interest in the liquid sample, for a low concentration of the substance of interest.

The first and second analysis measurements may be used individually to determine a concentration of a substance of interest in the liquid sample and may be suited for different concentrations of the substance of interest in the liquid sample. However, the first and second analysis measurements may also be used in combination in order to provide a further accuracy of measurement of concentration of the substance of interest.

Then, the plunger 110 is moved 516 back to the first position. Thus, the liquid sample is pushed out of the analysis cell 110. While the plunger 110 is moved back to the first position, the first and second wall portions 108, 109 of the analysis cell 102 are again wiped 518 using the at least one wiper 160, 162. Thus, the first and second wall portions 108, 109 are cleaned.

The device 100 may then optionally turn the LEDs 120, 124, 128 off and be set in an idle state in order to save power between measurements. Thereafter, a new measurement may be performed starting in 502 by performing a calibration measurement again. It should also be realized that calibration measurements need not be performed each time the plunger 110 is in the first position, because it may be assumed that the calibration measurement is valid for a number of measurements of liquid samples.

According to an embodiment, the method comprises moving the plunger 110 to only one of the intermediate position and the second position, such that only one analysis measurement is performed on the liquid sample. This could be used when it is known that a concentration of the substance of interest in the liquid sample is high or low, such that the proper path length to be used can be known beforehand.

According to another embodiment, the method comprises moving the plunger 110 to one of the intermediate position and the second position, such that one analysis measurement is performed on the liquid sample based on a short path length or a long path length. Based on result of such analysis measurement, a decision may be taken as to whether an analysis measurement in the other position is also needed in order to accurately determine the concentration of the substance of interest. Hence, two analysis measurements are only performed when it is identified that the other measurement is needed.

The method thus comprises selectively moving the plunger 110 to at least one of the second position and the intermediate position. The selective moving of the plunger 110 may thus be performed by moving the plunger 110 sequentially to the intermediate position and the second position, by moving the plunger 110 to one position and, thereafter deciding whether the plunger 110 is to be moved also to the other position, or by moving the plunger 110 to one of the positions based on knowledge that measurement at that position is sufficient for determining the concentration of the substance of interest.

It should be realized that if the plunger 210 which comprises an additional third portion 215 of the plunger 210 is used, the method may further comprise moving the plunger 210 to each of the first and the second intermediate position and the second position for performing analysis measurements in each of the positions. Alternatively, the method may comprise moving the plunger 210 to one or more of the positions based on knowledge of the concentration of the substance of interest or based on results determined in analysis measurements in one of the positions.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A device for light-based analysis of a substance in a liquid sample, said device comprising:
   an analysis cell for holding the liquid sample during analysis;
   an inlet and outlet for transporting the liquid sample to and from the analysis cell;
   a light source for generating light for illuminating the liquid sample in the analysis cell;
   a light detector for detecting light, wherein the light detector and the light source are arranged on opposite sides of the analysis cell such that the light detector is configured to detect light having passed through the liquid sample; and
   a plunger configured to fit in the analysis cell and configured for movement along walls of the analysis cell for allowing entry of the liquid sample into the analysis cell and pushing the liquid sample out of the analysis cell,
   wherein the plunger comprises a first portion having a first thickness corresponding to a cross-section of the analysis cell and a second portion having a second thickness which is smaller than the first thickness for allowing a first analysis measurement to be performed while the second portion of the plunger is arranged between the light source and the light detector such that light being detected by the light detector is passed through the second portion and through the liquid sample between the second portion of the plunger and a wall of the analysis cell,
   wherein the plunger is movable to a completely retracted position in the analysis cell for allowing a second analysis measurement to be performed such that light being detected by the light detector is passed through the liquid sample filling a space between opposite walls of the analysis cell, and
   wherein the first portion of the plunger comprises a reference block, which is configured to be arranged in a light path in the analysis cell between the light source and the light detector in a calibration measurement, wherein the reference block is transparent to the light generated by the light source.

2. The device according to claim 1, wherein the second portion of the plunger is formed of a material which is transparent to the light generated by the light source.

3. The device according to claim 1, wherein the plunger comprises a third portion, wherein the third portion of the plunger is formed of a material which is transparent to the light generated by the light source and wherein the third portion has a third thickness which is smaller than the second thickness for allowing a third analysis measurement to be performed while the third portion of the plunger is arranged between the light source and the light detector such that light being detected by the light detector is passed through the third portion and through the liquid sample between the third portion of the plunger and a wall of the analysis cell.

4. The device according to claim 1, wherein the device further comprises at least one plunger wiper, which is configured to make contact at least with the second portion of the plunger so as to clean a surface of the second portion of the plunger during movement of the plunger.

5. The device according to claim 1, wherein the plunger is arranged on a shaft, whereby movement of the shaft is configured to control movement of the plunger in the analysis cell.

6. The device according to claim 5, wherein the plunger is controlled by an actuator for moving the shaft and thereby moving the plunger in the analysis cell.

7. The device according to claim 1, wherein the device is configured such that, when the plunger is moved for allowing entry of the liquid sample into the analysis cell, a low pressure is formed in the analysis cell for sucking the liquid sample into the analysis cell.

8. The device according to claim 1, wherein the light source comprises at least a first light emitting diode, LED, for emitting light of a first wavelength corresponding to an absorbance peak of the substance to be analyzed.

9. The device according to claim 8, wherein the light source further comprises a second LED for emitting light of a second wavelength, wherein absorbance of the substance to be analyzed is substantially lower at the second wavelength than the first wavelength.

10. The device according to claim 9, wherein the light source further comprises a third LED for emitting light of a third wavelength for enabling detected transmittance of light at the first, second, and third wavelengths to be compared for analyzing the substance and/or for analyzing more than one substance in the liquid sample.

11. The device according to claim 1, wherein the device is configured for determining a concentration of nitrate in the liquid sample, wherein the light source is configured to generate ultraviolet light for illuminating the liquid sample.

12. A method for light-based analysis of a substance in a liquid sample, said method comprising:
   moving a plunger from a first position within an analysis cell selectively to at least one of a second position and an intermediate position between the first position and the second position within the analysis cell for allowing the liquid sample to be entered into the analysis cell, wherein the plunger comprises a first portion having a first thickness corresponding to a cross-section of the analysis cell and a second portion having a second thickness which is smaller than the first thickness and wherein the plunger, in the intermediate position, is arranged such that the second portion of the plunger is arranged between a light source and a detector;

performing an analysis measurement of the liquid sample by illuminating the liquid sample by light generated by the light source and detecting by the detector light having passed the liquid sample in the analysis cell, wherein, in case the plunger is in the second position, the light detector detects light being passed through the liquid sample filling a space between opposite walls of the analysis cell, and wherein, in case the plunger is in the intermediate position, the light detector detects light being passed through the second portion and through the liquid sample between the second portion of the plunger and a wall of the analysis cell; and moving the plunger from the second position or the intermediate position to the first position to push the liquid sample out of the analysis cell, wherein the plunger comprises a reference block and wherein the method further comprises performing a calibration measurement while the plunger is in the first position by illuminating the reference block by light generated by the light source and detecting by the detector light having passed the reference block, wherein the reference block is transparent to the light generated by the light source.

13. The method according to claim 12, wherein the method comprises performing a first analysis measurement while the plunger is in the intermediate position and performing a second analysis measurement while the plunger is in the second position.

* * * * *